United States Patent
Kadosh et al.

(10) Patent No.: US 11,838,209 B2
(45) Date of Patent: Dec. 5, 2023

(54) CARDINALITY-BASED TRAFFIC CONTROL

(71) Applicant: MELLANOX TECHNOLOGIES, LTD., Yokneam (IL)

(72) Inventors: Matty Kadosh, Hadera (IL); Gil Levy, Hod Hasharon (IL); Yuval Shpigelman, Netanya (IL); Omer Shabtai, Tel Aviv (IL); Yonatan Piasetzky, Tel Aviv (IL); Liron Mula, Ramat Gan (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 196 days.

(21) Appl. No.: 17/335,312

(22) Filed: Jun. 1, 2021

(65) Prior Publication Data
US 2022/0385578 A1   Dec. 1, 2022

(51) Int. Cl.
| H04L 12/26 | (2006.01) |
| H04L 47/12 | (2022.01) |
| G06T 1/20  | (2006.01) |
| H04L 47/11 | (2022.01) |

(52) U.S. Cl.
CPC ............... *H04L 47/12* (2013.01); *G06T 1/20* (2013.01); *H04L 47/11* (2013.01)

(58) Field of Classification Search
CPC ..... H04L 47/10; H04L 47/2441; H04L 47/30; H04L 47/32; H04L 12/5693; H04L 47/12; H04L 47/122; H04L 47/225; H04L 47/11; G06T 1/20; G06F 9/00
See application file for complete search history.

(56) References Cited

U.S. PATENT DOCUMENTS

| 5,898,673 | A  |   | 4/1999  | Riggan et al. |
| 6,049,541 | A  | * | 4/2000  | Kerns ................ H04Q 11/0478 370/440 |
| 6,151,301 | A  | * | 11/2000 | Holden ................ H04L 49/255 370/414 |
| 6,490,252 | B1 | * | 12/2002 | Riggan .............. H04Q 11/0478 709/239 |
| 7,088,678 | B1 | * | 8/2006  | Freed ...................... H04L 47/10 370/236.1 |

(Continued)

FOREIGN PATENT DOCUMENTS

| CN | 106133713 | 11/2016 |
| CN | 107346270 | 11/2017 |

(Continued)

OTHER PUBLICATIONS

"HyperLogLog," Wikipedia, last updated Jan. 13, 2021, 5 pages [retrieved online from: en.wikipedia.org/wiki/HyperLogLog].

Kumar et al. "Swift: Delay is Simple and Effective for Congestion Control in the Datacenter," SIGCOMM '20, Proceedings of the Annual conference of the ACM Special Interest Group on Data Communication on the applications, technologies, architectures, and protocols for computer communication, Jul. 2020, pp. 514-528.

(Continued)

*Primary Examiner* — Phuongchau Ba Nguyen
(74) *Attorney, Agent, or Firm* — Sheridan Ross P.C.

(57) ABSTRACT

Devices, methods, and systems are provided. In one example, a method is described to include measuring a cardinality of actual data flows at a flow-processing resource, determining that the cardinality of the actual data flows triggers a congestion control action, and, in response to determining that the cardinality of the actual data flows triggers the congestion control action, implementing the congestion control action with respect to the flow-processing resource.

20 Claims, 8 Drawing Sheets

(56) References Cited

U.S. PATENT DOCUMENTS

| | | | | |
|---|---|---|---|---|
| 7,621,162 | B2* | 11/2009 | Bartky | H04L 47/32 |
| | | | | 370/428 |
| 8,982,703 | B2* | 3/2015 | Almog | H04L 47/32 |
| | | | | 370/235 |
| 2008/0159293 | A1* | 7/2008 | Tamai | H04L 47/2483 |
| | | | | 370/392 |
| 2010/0020689 | A1* | 1/2010 | Tang | H04L 69/16 |
| | | | | 370/235 |
| 2016/0087898 | A1 | 3/2016 | Ansari et al. | |
| 2019/0196996 | A1* | 6/2019 | Balakrishnan | G06F 13/30 |
| 2022/0326058 | A1* | 10/2022 | Akuzawa | G01F 1/6842 |

FOREIGN PATENT DOCUMENTS

| | | |
|---|---|---|
| CN | 107528791 | 12/2017 |
| CN | 108933738 | 12/2018 |
| CN | 112073376 | 12/2020 |
| CN | 112751776 | 5/2021 |

OTHER PUBLICATIONS

Li et al. "HPCC: High Precision Congestion Control," SIGCOMM '19: Proceedings of the ACM Special Interest Group on Data Communication, Aug. 2019, pp. 44-58.

Official Action with Machine Translation for China Patent Application No. 202210591701.1, dated Sep. 15, 2023, 17 pages.

* cited by examiner

CARDINALITY-BASED TRAFFIC CONTROL

FIELD OF THE DISCLOSURE

The present disclosure is generally directed toward networking devices and, in particular, toward congestion control in flow-processing systems.

BACKGROUND

Low-latency operations in a data center are becoming an increasingly important topic. Managing packet congestion in the data center is an important part of delivering reliable low-latency performance. Managing or minimizing packet loss is also of concern in a data center. Existing congestion control approaches are inadequate, especially at scale, if latency builds to the level of milliseconds or more. Congestion control is an important aspect of system performance in a data center.

BRIEF SUMMARY

Embodiments of the present disclosure aim to improve congestion control. For instance, it is an aspect of the present disclosure to improve congestion control convergence time. In some embodiments, a congestion controller is described that measures cardinality (e.g., by counting a number of different flows) that relate to a specific congestion point (e.g., a queue of a switch or resources of processing circuitry in a Graphics Processing Unit (GPU)). The congestion controller can use the measured cardinality to better tailor a congestion control action for the congestion point.

Most existing congestion control approaches depend on parameters such as switch queue depth, latency, etc. Existing congestion control approaches cannot react differently (or appropriately) based on the number of flows facing congestion or whether a particular flow is stuck at the head of the line and blocking other flows. Failure to consider the number of flows facing congestion can result in an underachieving congestion controller, which will result in increased latency. The congestion controller described herein is configured to estimate or determine the number of flows targeting a specific flow-processing resource (e.g., a queue of a switch or resources of processing circuitry in a GPU) at a specific time window and then implement an appropriate congestion control action to account for the estimated or determined number of flows targeting the flow-processing resource. In this way, a congestion controller is capable of implementing congestion control action(s) based on a forward-looking approach rather than always being reactive. A forward-looking approach to congestion control can help improve the performance and stability of the congestion controller and reduce the overall latency in a data center, for example. Another aspect of the present disclosure is to provide an approach that has the ability to count only major flows and filter small flows that do not substantially impact congestion. For example, approaches described herein leverage the belief that ~90% of flows are very small and should be ignored. A congestion control approach as described herein can use a filter mechanism to only count major flows.

In an illustrative example, a device is disclosed that includes: a resource configured to receive a number of data flows, wherein the resource is subject to flow congestion when the number of data flows exceeds a threshold value; and a controller that measures a cardinality of actual data flows received at the resource and implements a congestion control action in response to the cardinality of the actual data flows received at the resource.

In another example, a method is disclosed that includes: measuring a cardinality of actual data flows at a flow-processing resource; determining that the cardinality of the actual data flows triggers a congestion control action; and in response to determining that the cardinality of the actual data flows triggers the congestion control action, implementing the congestion control action with respect to the flow-processing resource.

In yet another example, a system is disclosed that includes: a processor and a computer memory device coupled with the processor, wherein the computer memory device comprises data stored thereon that enables the processor to: measure a cardinality of actual data flows at a flow-processing resource; determine that the cardinality of the actual data flows triggers a congestion control action; and in response to determining that the cardinality of the actual data flows triggers the congestion control action, implement the congestion control action with respect to the flow-processing resource.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
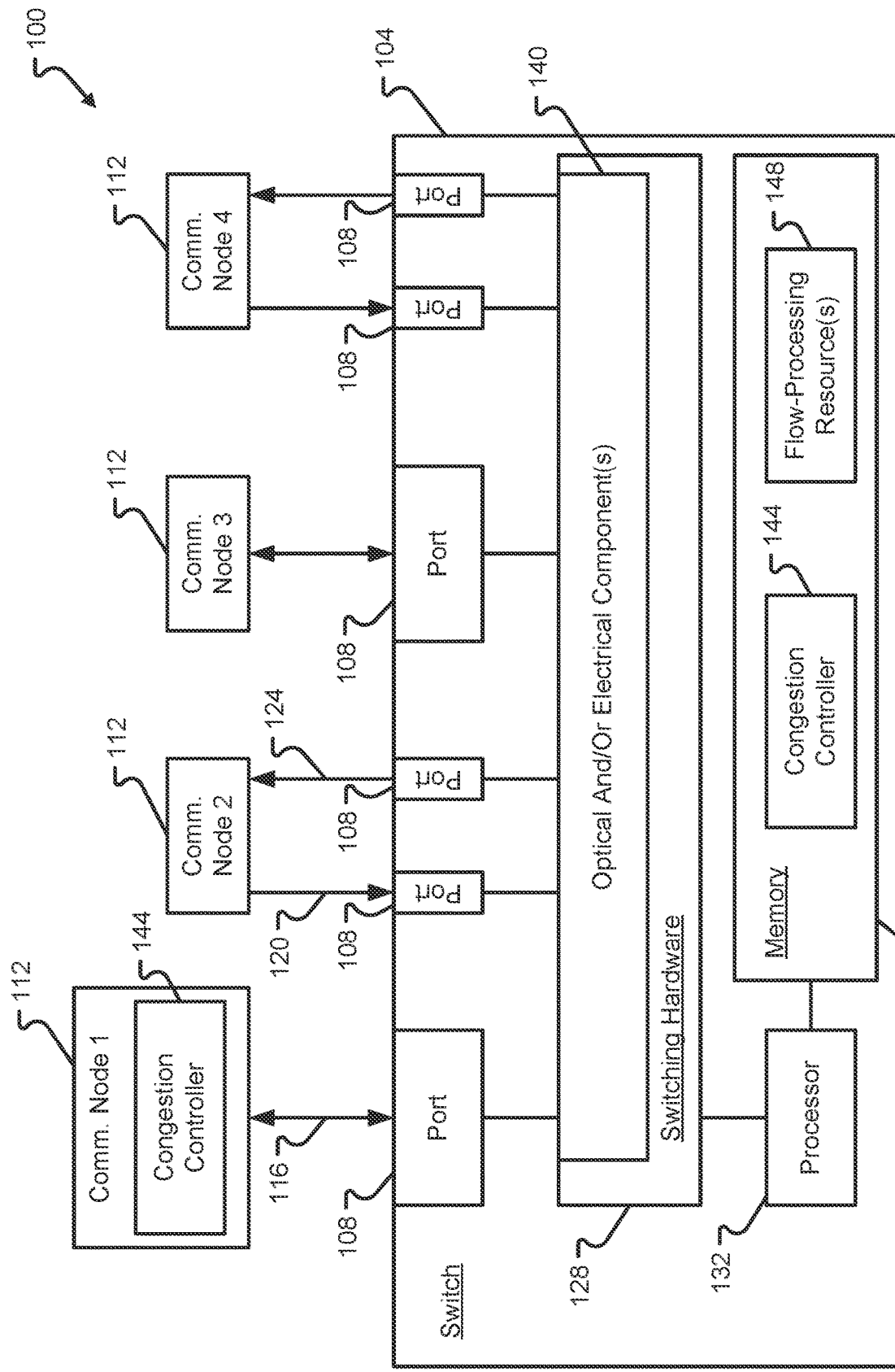
FIG. 1 is a block diagram illustrating a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-8, various systems and methods for implementing congestion control in a computing system will be described in accordance with at least some embodiments of the present disclosure. As will be described in more detail herein, a congestion controller is contemplated that is configured to measure cardinality (e.g., by counting a number of different flows) that relate to a specific congestion point, such as a flow-processing resource. A congestion controller is also contemplated to throttle data transmission rates to prevent packet loss and/or added latency. In some examples, cardinality can be used to help the congestion controller perform these and other functions more effectively and efficiently. Certain examples of a flow-processing resource will be described as being implemented in a switch or similar type of networking device. Other examples of a flow-processing resource will be described as being implemented in a GPU or components of a GPU. While embodiments will describe a congestion controller as being co-located in the same device as a flow-processing resource that is being managed (e.g., that is subject to a congestion control action implemented by the congestion controller), it should be appreciated that a congestion controller can be located in a first device (e.g., a first computational device) whereas the flow-processing resource that is being managed by the congestion controller is located in a second device (e.g., a communication node, a switch or, a GPU that is different from the first computational device).

As will be described herein, the congestion controller may determine when to implement a congestion control action and may select a particular congestion control action based on a measured cardinality of actual data flows measured at the flow-processing resource. Calculating an exact cardinality of a multiset often necessitates an amount of memory proportional to the cardinality. Providing this amount of memory may prove impractical for very large data sets, such as those being operated on within a switch or GPU in a data center. Probabilistic cardinality, however, can be determined using a probabilistic cardinality estimator, which uses significantly less memory than is required to calculate an exact cardinality of a multiset. One example of a probabilistic cardinality estimator that may be employed by the congestion controller described herein is a HyperLogLog estimator. By using the HyperLogLog, the congestion controller may be configured to estimate cardinalities of more than $10^9$ with no more than 2% error and by using less than 2 kB of memory.

Additional details of the congestion controller and its utilization of HyperLogLog will be described in further detail herein. It should be appreciated, however, that the congestion controller may use other mechanisms for measuring the cardinality of a data flow. A probabilistic cardinality estimator implemented by a congestion controller may utilize a number of different cardinality determination approaches including, without limitation, a LogLog approach, a HyperLogLog++ approach, a streaming HyperLogLog approach, combinations thereof, variants thereof, and the like.

Referring initially to FIG. 1, a first illustrative computational system 100 is shown in which a congestion controller 144 can be utilized to control congestion in a switch 104. The computational system 100 is shown to include a switch 104 connecting one or more communication nodes 112 via a number of communication ports 108. The illustrated switch 104 is shown to be connected with four communication nodes 112 via a plurality of communication ports 108. The illustration of four communication nodes 112 is for ease of discussion and should not be construed as limiting embodiments of the present disclosure. Specifically, a switch 104 may be configured to connect any number of communication nodes 112 and the switch 104 may include any number of ports 108 to facilitate such connections. Even more specifically, a switch 104 may be configured to connect a greater or lesser number of communication nodes 112 than are shown in FIG. 1. Moreover, embodiments of the present disclosure contemplate that not all ports 108 of a switch 104 need to be connected with a communication node 112. For instance, one or more ports 108 of a switch 104 may be left unconnected (e.g., open) and may not have any particular networking cable 116 plugged into the port 108.

The communication nodes 112 may be the same type of devices or different types of devices. As a non-limiting example, some or all of the communication nodes 112 may correspond to a Top-of-Rack (TOR) switch. Alternatively or additionally, one or more of the communication nodes 112 may correspond to a device other than a TOR switch. The communication nodes 112 do not necessarily need to communicate using the same communication protocol because the switch 104 may include components to facilitate protocol conversion and/or a communication node 112 may be connected to the switch 104 via a pluggable network adapter.

While the communication nodes 112 may correspond to a TOR switch, one or more of the communication nodes 112 may be considered host devices, servers, network appliances, data storage devices, network adapter (e.g., Network Interface Card (NIC) or Host Channel Adapter (HCA)) or combinations thereof. A communication node 112, in some embodiments, may correspond to one or more of a Personal Computer (PC), a laptop, a tablet, a smartphone, a server, a collection of servers, or the like. It should be appreciated that a communication node 112 may be referred to as a host, which may include a network host, an Ethernet host, an InfiniBand (IB) host, etc. As another specific but non-limiting example, one or more of the communication nodes 112 may correspond to a server offering information resources, services and/or applications to user devices, client devices, or other hosts in the computational system 100. It should be appreciated that the communication nodes 112 may be assigned at least one network address (e.g., an IP address) and the format of the network address assigned thereto may depend upon the nature of the network to which the communication node 112 is connected.

FIG. 1 illustrates that one or multiple networking cables may be used to connect a communication node 112 to the switch 104. In some embodiments, a communication node 112 may connect to a single port 108 via a bidirectional communication link 116. The bidirectional communication link 116 may be established over a networking cable and may utilize any communication protocol known or yet to be developed for the transmission of data packets.

A communication node 112 may alternatively, or additionally, be connected with the switch 104 via multiple ports 108. In such a configuration, one of the ports 108 may be used to carry packets from the switch 104 to the communication node 112 whereas the other of the ports 108 may be used to carry packets from the communication node 112 to the switch 104. In this configuration, separate networking cables may be used for the data uplink 120 and the data downlink 124.

The switch 104 may correspond to an optical switch and/or electrical switch. In some embodiments, the switch 104 may include switching hardware 128 that is configurable to selectively interconnect the plurality of ports 108, thereby enabling communications between the plurality of ports 108, which enables communications between the communication nodes 112. In some embodiments, the switching hardware 128 may be configured to selectively enable the plurality of communication nodes 112 to communicate based on a particular configuration of the switching hardware 128. Specifically, the switching hardware 128 may include optical and/or electrical component(s) 140 that are switchable between different matching configurations.

In some embodiments, the switch 104 may correspond to an optical circuit switch, which means that the optical and/or electrical components 140 may include a number of optical and/or opto-electronic components that switch optical signals from one channel to another. The optical and/or electrical components 140 may be configured to provide an optical switching fabric, in some embodiments. As an example, the optical and/or electrical component(s) 140 may be configured to operate by mechanically shifting or moving an optical fiber to drive one or more alternative fibers. Alternatively or additionally, the optical and/or electrical component(s) 140 may include components that facilitate switching between different port matchings by imparting electro-optic effects, magneto-optic effects, or the like. For instance, micromirrors, piezoelectric beam steering mechanisms, liquid crystals, filters, and the like may be provided in the optical and/or electrical components 140 to facilitate switching between different matching configurations of optical channels.

In some embodiments, the switch 104 may correspond to an electrical switch, which means that the optical and/or electrical components 140 may include a number of electrical components or traditional electronic circuitry that is configured to manage packet flows and packet transmissions. Accordingly, the optical and/or electrical components 140 may alternatively or additionally include one or more Integrated Circuit (IC) chips, microprocessors, circuit boards, Data Processing Units (DPUs), simple analog circuit components (e.g., resistors, capacitors, inductors, etc.), digital circuit components (e.g., transistors, logic gates, etc.), memory devices, Field Programmable Gate Arrays (FPGAs), Application Specific Integrated Circuits (ASICs), combinations thereof, and the like.

The switch 104 is further illustrated to include a processor 132 and memory 136. The processor 132 may correspond to or include one or more of an IC chip, a microprocessor, or the like. The memory 136 may include any number of types of memory devices. As an example, the memory 136 may include Random Access Memory (RAM), Read Only Memory (ROM), flash memory, Electronically-Erasable Programmable ROM (EEPROM), Dynamic RAM (DRAM), buffer memory, combinations thereof, and the like. It should be appreciated that the congestion controller 144 may be stored in a first type of memory device whereas the flow-processing resources 148 may correspond to a different type of memory device (e.g., buffer memory or any other suitable device that can be used to provide a switch queue).

The processor 132 and memory 136 may be configured to implement congestion control operations in the switch. As an example, the memory 136 may store data (e.g., instructions and/or machine learning model(s)) that is executable by the processor 132. When the processor 132 executes the data stored in memory 136, functions of the congestion controller 144 may be implemented within the switch 104. While FIG. 1 illustrates the processor 132 and memory 136 containing the congestion controller 144 as being within the switch 104, it should be appreciated that the congestion controller 144 (and appropriate hardware to implement the same) could be provided in a communication node 112 or multiple communication nodes 112. For instance, a communication node 112 (e.g., a NIC or HCA) may be configured to obtain cardinality information from the switch 104 and implement the congestion decisions and controls are described herein. Thus, features of a congestion controller 144 and its capabilities can be provided in the switch 104, in a communication node 112, or combinations thereof without departing from the scope of the present disclosure.

More specifically, when the processor 132 executes the congestion controller 144, one or more congestion control functions may be performed with respect to flow-processing resources 148. Non-limiting examples of flow-processing resources 148 include buffer memory that is used or allocated as a queue in the switch. In some embodiments, the congestion controller 144 may be configured to measure a number of actual data flows in the flow-processing resource(s) 148 (e.g., a queue) and then determine a cardinality of the actual data flows for the flow-processing resource(s) 148. Based on the cardinality of actual data flows received at the flow-processing resource(s) 148, the congestion controller 144 may implement one or more congestion control actions. In addition to congestion control actions, the congestion controller 144 may also be configured to implement one or more congestion avoidance actions. The congestion avoidance actions may also be implemented in response to the cardinality of actual data flows received at the flow-processing resource 148. Non-limiting examples of congestion control actions that may be automatically invoked by the congestion controller based on the measured cardinality include an exponential backoff, a window reduction, and/or a fair queuing.

In some embodiments, the congestion controller 144 may be configured to measure the cardinality of actual data flows for one or more processing resources 148 and then automatically implement a congestion control action in response to the cardinality of the actual data flows falling below a predetermined threshold value at a specific time window. Alternatively or additionally, the congestion controller 144 may be configured to measure the cardinality of actual data flows over a period of time and determine an average cardinality of actual data flows prior to implementing the congestion control action. In some embodiments, the congestion controller 144 may be configured to implement a first congestion control action in response to the cardinality of actual data flows falling below a first threshold, but the congestion controller 144 may also be configured to implement a second congestion control action in response to the cardinality of actual data flows falling below a second threshold. In some embodiments, the first threshold is less than the second threshold and the first congestion control action is more severe than the second congestion control action.

In some embodiments, the congestion controller 144 is configured to utilize a number of distinct flows (e.g., cardinality) to improve congestion control for the flow-processing resource(s) 148. The congestion controller 144 may be configured to utilize multiple different cardinality estimators. If the congestion controller 144 is configured to utilize different cardinality estimators, then the congestion controller 144 may utilize a first cardinality estimator until a cardinality reaches a predetermined threshold, at which point the congestion controller 144 begins utilizing a second cardinality estimator. The congestion controller 144 may continue using the second cardinality estimator for a predetermined amount of time and/or until the cardinality reaches a second predetermined threshold, at which point the congestion controller 144 can switch back to using the first cardinality estimator or a third cardinality estimator.

As can be appreciated, the congestion controller 144 may be configured to utilize any suitable, known, or yet-to-be-developed cardinality estimator. As some non-limiting examples, the congestion controller 144 may utilize a HyperLogLog estimator, a LogLog estimator, a HyperLogLog++ estimator, a streaming HyperLogLog estimator, Linear Counting, or the like. A HyperLogLog estimator may have three main operations (e.g., an add operation, a count operation, and a merge operation). The data of the HyperLogLog estimator may be stored in an array of M counters called registers with size m that are set to an initial state. In the add operation, the HyperLogLog estimator may compute a hash of the input data with a hash function, getting the first bits, and adding the first bits to obtain the address of the register to be modified. In the count operation, the HyperLogLog estimator may compute the harmonic mean of the m registers and using a constant, derive an estimate E of the count:

$$Z = \left(\sum_{j=1}^{m} 2^{-M[j]}\right)^{-1}$$

$$\alpha_m = \left(m \int_0^\infty \left(\log_2\left(\frac{2+u}{1+u}\right)\right)^m du\right)^{-1}$$

$$E = \alpha_m m^2 Z$$

In the above, n may correspond to the unknown cardinality of M, each subset $M_j$ will have n/m elements. In some embodiments, a constant $\alpha_m$ can be introduced to correct a systematic multiplicative bias present due to hash collisions. The constant is not simple, but can be approximated as shown below:

$$\alpha_m \approx \begin{cases} m = 16 & 0.673 \\ m = 32 & 0.697 \\ m = 64 & 0.709 \\ m \geq 128 & \dfrac{0.7213}{1 + \dfrac{1.079}{m}} \end{cases}$$

The HyperLogLog technique, though, may be biased for small cardinalities below a threshold of $$\frac{5}{2}m.$$

A different cardinality may be used by the congestion controller 144 for small cardinalities (e.g., Linear Counting). In the case where the cardinality estimate is less than the threshold described above $$\left(e.g., \frac{5}{2}m\right),$$

an alternative calculation can be used:

1. Let V be the count of registers equal to 0.
2. if V=0, use the standard HyperLogLog estimator E above.
3. Otherwise, use Linear Counting:

$$E^* = m\log\left(\frac{m}{V}\right)$$

Alternatively or additionally, very large cardinalities approaching the limit of the size of the registers $$\left(\text{e.g., } E > \frac{2^{32}}{30} \text{ for 32-bit registers}\right),$$

the cardinality can be estimated by:

$$E^* = -2^{32}\log\left(1 - \frac{E}{2^{32}}\right)$$

In the merge operation for two HyperLogLogs (hll1, hll2), the merge may include obtaining the maximum for each pair of registers j:1 . . . m $$hll_{union}[j] = \max(hll_1[j], hll_2[j])$$

In some embodiments, the congestion controller 144 may be configured to implement a reaction point (e.g., respond to the cardinality falling below a predetermined threshold) and react less severely for large cardinality, thereby providing faster convergence. In some embodiments, cardinality may be configured to reflect only extremely large flows (e.g., elephant flows).

Figure 2:
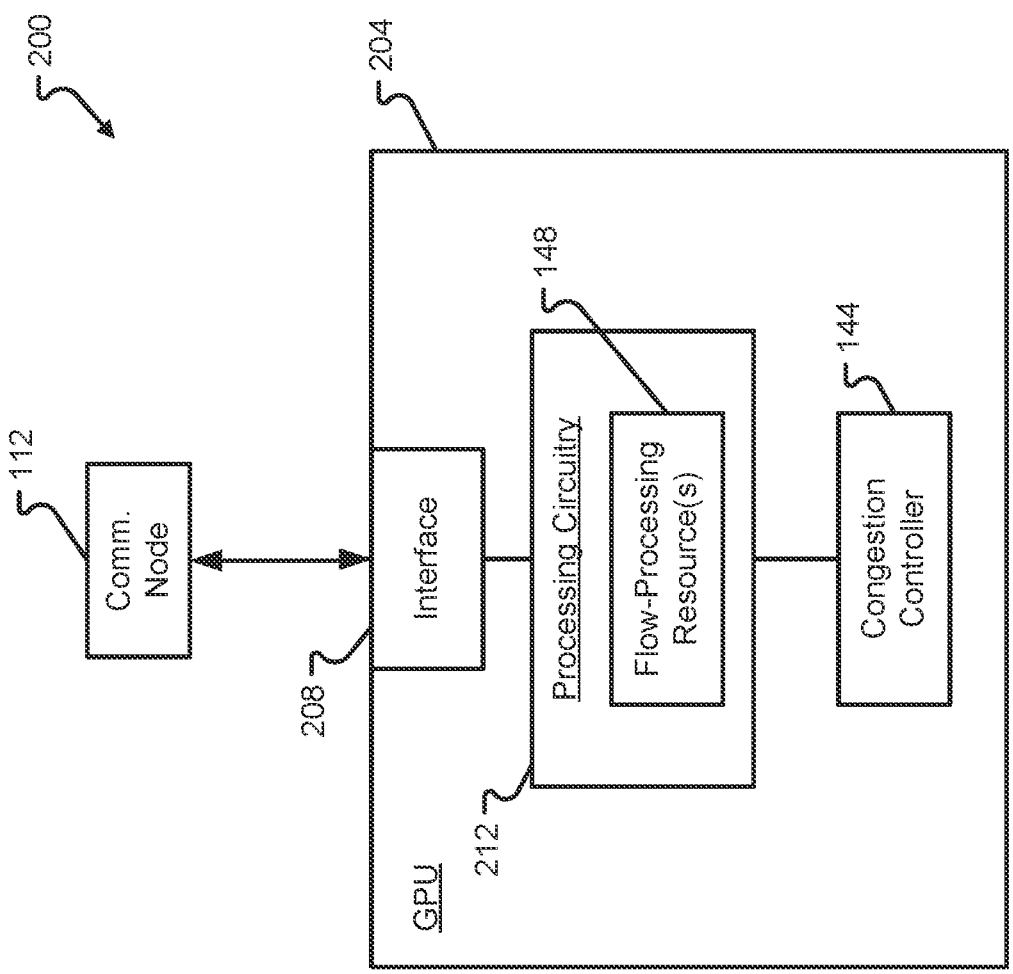
FIG. 2 is a block diagram illustrating another computing system in accordance with at least some embodiments of the present disclosure.

As mentioned above, the congestion controller 144 may be implemented to provide congestion control within a switch 104. It should be appreciated, however, that other devices could also benefit from a congestion controller 144 as described herein. For instance, as shown in FIG. 2, a GPU 204 could also benefit from operations of a congestion controller 144. FIG. 2 illustrates a second possible computational system 200 in which flow-processing resources of a GPU 204 are exposed to a congestion controller 144 to mitigate congestion issues within the GPU 204.

In some embodiments, the GPU 204 includes an interface 208 that provides a physical and/or electrical interconnection between the GPU 204 and a communication node 112. The GPU 204 is also shown to include processing circuitry 212, which may include one or many flow-processing resources 148. In some embodiments, the flow-processing resources 148 may correspond to memory devices (e.g., buffer memory), registers, transistors, analog circuits, digital circuits, or any suitable type of processing circuitry 212 that is useable within a GPU 204. The flow-processing resources 148 may be subject to congestion much like flow-processing resources 148 described in connection with the switch 104. Thus, the congestion controller 144 may be configured to measure or estimate the cardinality of actual flows in the flow-processing resource(s) 148 of the processing circuitry 212 and implement one or more congestion control actions based on the cardinality.

Figure 3:
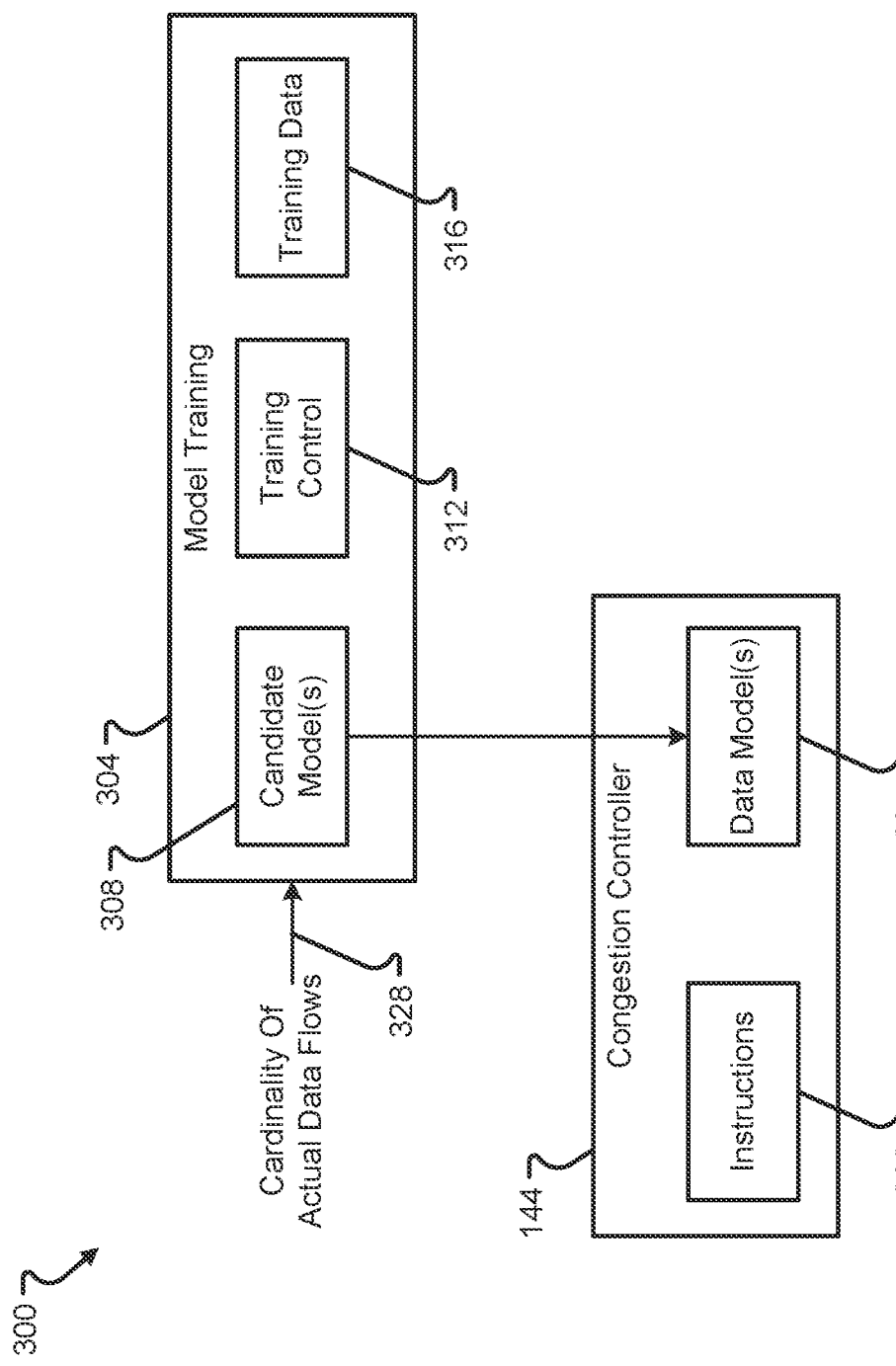
FIG. 3 is a block diagram illustrating a system for training data models for use by a congestion controller in accordance with at least some embodiments of the present disclosure.

With reference now to FIG. 3, additional details of the congestion controller 144 will be described in accordance with at least some embodiments of the present disclosure. The congestion controller 144 is shown to include instructions 320 (e.g., machine-readable instructions that are executable by a processor 132) and/or data model(s) 324. The data model(s) 324 may correspond to one or more of a machine learning model, a collection of machine learning models, an artificial neural network, a collection of artificial neural networks, combinations thereof, and the like.

As can be appreciated, the data model(s) 324 may cooperate with the instructions 320 to provide functionality of the congestion controller 144 as described herein. It should also be appreciated that the congestion controller 144 may only comprise instructions 320 (e.g., no data model(s) 324) or may only comprise data model(s) 324 (e.g., no instructions 320). It should be appreciated that a cardinality estimator implemented by the congestion controller 144 may be implemented as instructions 320 and/or data model(s) 324. In a congestion controller 144 that utilizes data model(s) 324 it may be desirable to ensure the data model(s) 324 are adequately trained prior to being used in a production environment on actual data flows. As an example, the data model(s) 324 of the congestion controller 144 may be used only after being properly trained by a model training system 304.

The model training system 304 may include a number of candidate models 308 that are trained with training data 316, which may include actual data flows 328 measured in flow-processing resources 148. The model training system 304 may also include a training control 312 which ensures the candidate models 308 are trained on the training data 316 for a predetermined amount of time, until a predetermined amount of training data 316 has been processed by a candidate model 308, and/or until a candidate model 308 exhibits a predetermined and sufficiently accurate behavior (e.g., determining or estimating cardinality within a predetermined accuracy (e.g., less than 2%)). It should be appreciated that when a candidate model 308 has been sufficiently trained by the model training system 304, the candidate model 308 may be transferred into the congestion controller 144 for use as a production data model 324. In some embodiments, the data model(s) 324 may be configured to determine or estimate cardinality. In some embodiments, the data model(s) 324 may be configured to determine or select an appropriate congestion control action and automatically cause the congestion control action to be implemented by the flow-processing resource(s) 148 being controlled by the congestion controller 144.

Figure 4:
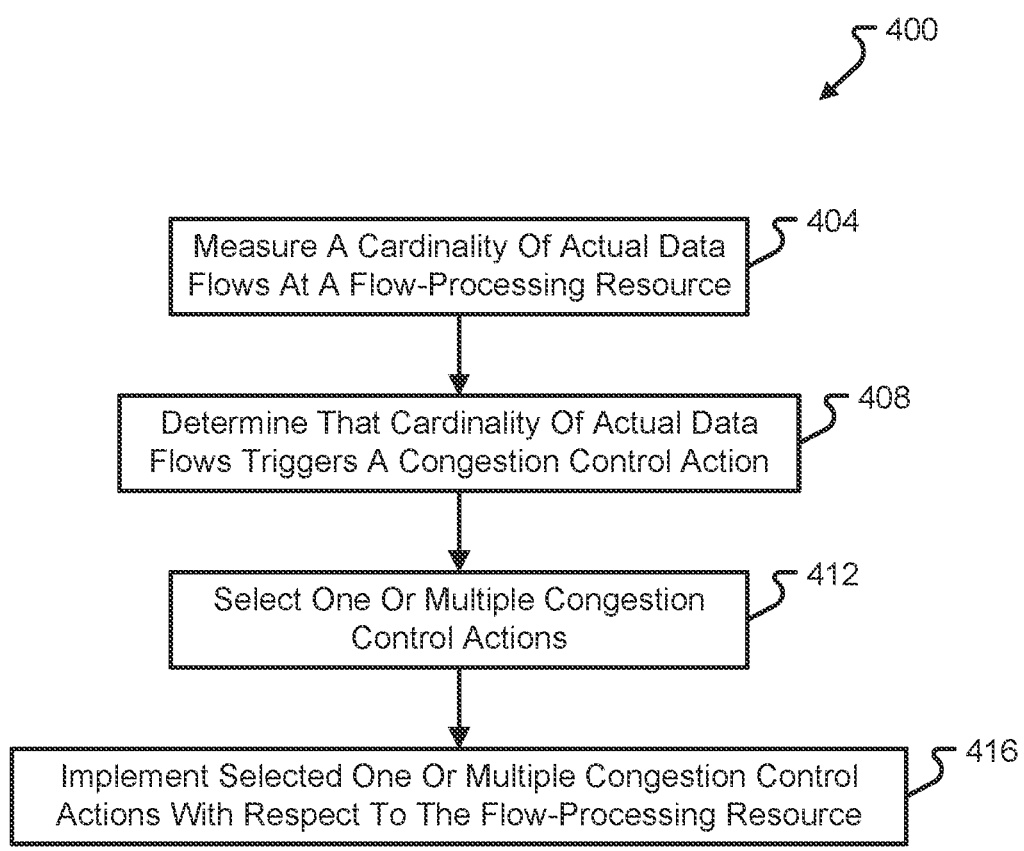
FIG. 4 is a flow diagram illustrating a first method of operating a congestion controller in accordance with at least some embodiments of the present disclosure.
Figure 5:
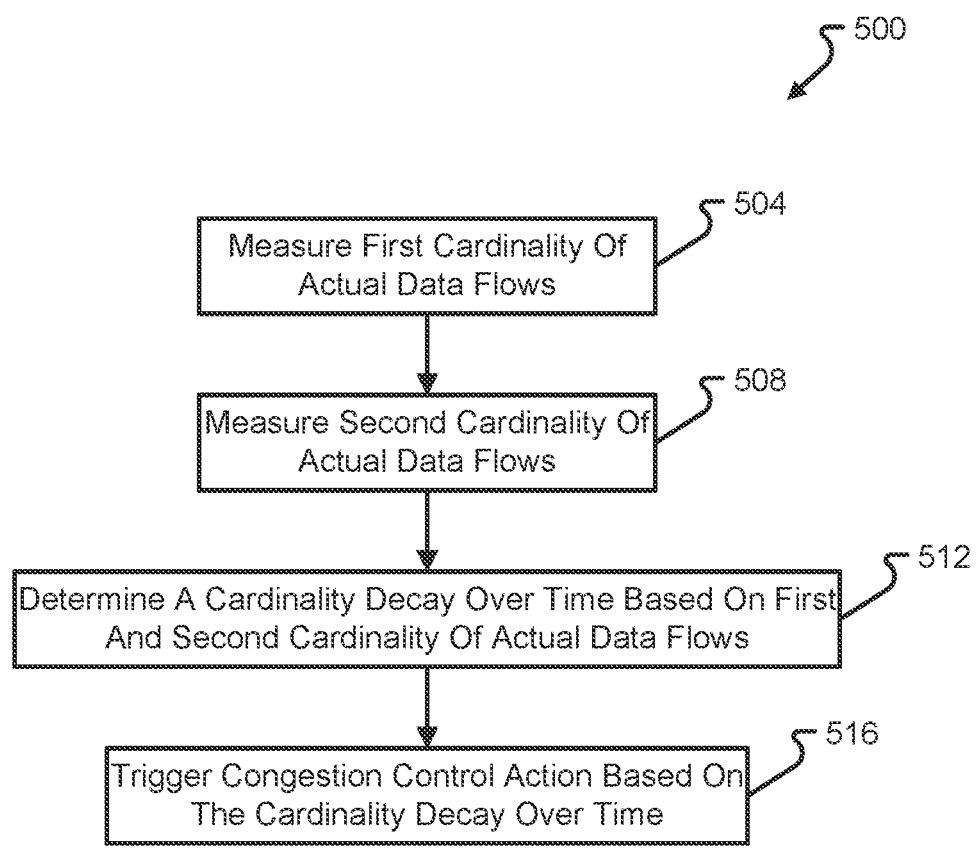
FIG. 5 is a flow diagram illustrating a second method of operating a congestion controller in accordance with at least some embodiments of the present disclosure.
Figure 6:
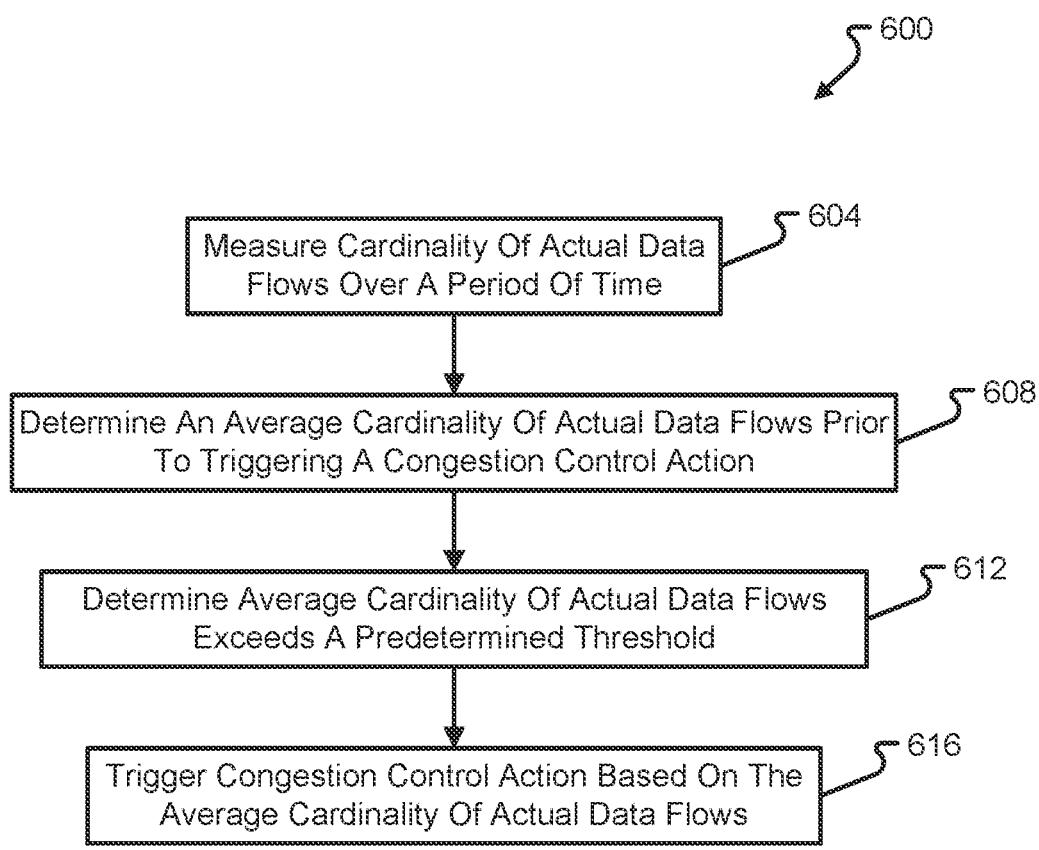
FIG. 6 is a flow diagram illustrating a third method of operating a congestion controller in accordance with at least some embodiments of the present disclosure.

Referring now to FIGS. 4-6, various methods will be described in accordance with at least some embodiments of the present disclosure. The disclosed methods will be described in a particular order and/or as being performed by particular components of a system 100, but it should be appreciated that the steps of method(s) may be performed in any suitable order (or in parallel), may be combined with step(s) from other method(s), and/or may be performed by other components described herein.

While various methods will be described in connection with considering cardinality for congestion control, it should be appreciated that cardinality may not be the only input considered by the congestion controller 144 when implementing one or more of these methods. Rather, the cardinality may be used alongside other information available to a congestion controller 144 (e.g., buffer occupancy). In one example, the congestion controller 144 could be configured to determine transmission rate range by estimated cardinality, and use buffer information to finetune the actual rate. In this example, the Rate may be represented by the following:

Rate=line_rate/cardinality*buffer factor

Where buffer factor is in [0.9,1.1] to correct for the cardinality estimation error and the filtered small flows. In this example, the Rate could be computed directly from the congested switch buffers.

Referring initially to FIG. 4, a first method 400 of operating a congestion controller 144 will be described in accordance with at least some embodiments of the present disclosure. The method 400 begins with a congestion controller 144 measuring actual data flows at a flow-processing resource 148 (step 404). The congestion controller 144 may then determine or estimate a cardinality of actual data flows at the flow-processing resource 148 in this step. In particular, the cardinality of actual data flows may be determined by the congestion controller 144 and then compared to one or more cardinality thresholds to determine if the cardinality of actual data flows triggers one or more congestion control actions (step 408).

In some embodiments, the congestion controller 144 may select one or more congestion control actions 412 based on the determined cardinality of actual data flows and based on whether the cardinality of actual data flows has triggered a particular congestion control action (e.g., fallen below a predetermined threshold that is associated with a particular congestion control action, where different congestion control actions have different cardinality thresholds associated therewith) (step 412). The method 400 may then continue with the congestion controller 144 implementing the one or more congestion control actions selected in step 412 with respect to the flow-processing resource 148 (step 416). Examples of congestion control actions that may be implemented in this step include, without limitation, an exponential backoff, a window reduction, and a fair queuing.

Referring now to FIG. 5, a second method 500 of operating a congestion controller 144 will be described in accordance with at least some embodiments of the present disclosure. The method 500 begins with the congestion controller 144 measuring a first cardinality of actual data flows at a flow-processing resource 148 (step 504). The method 500 continues with the congestion controller 144 measuring a second cardinality of actual data flows at the flow-processing resource 148 (step 508). The first and second cardinalities may be measured (or estimated) using different cardinality estimators (e.g., a HyperLogLog estimator, a LogLog estimator, a HyperLogLog++ estimator, a streaming HyperLogLog estimator, Linear Counting, etc.). Alternatively or additionally, the first and second cardinalities may be measured or estimated using the same cardinality estimator, but the cardinalities may be measured or estimated at different points in time.

The method 500 may continue with the congestion controller 144 determining a cardinality decay over time based on the first and second cardinalities determined in steps 504 and 508 (step 512). The cardinality decay over time may then be used to trigger a congestion control action (step 516). In some embodiments, a congestion control action may be selected based on whether or not the cardinality decay over time meets, exceeds, or falls below a predetermined threshold. Moreover, the congestion control action may be selected based on a magnitude of the cardinality decay over time.

Referring now to FIG. 6, a third method 600 of operating a congestion controller 144 will be described in accordance with at least some embodiments of the present disclosure. The method 600 begins with the congestion controller 144 measuring a cardinality of actual data flows at a flow-processing resource 148 over a period of time (step 604). As the cardinality is measured over time, the congestion controller 144 may determine an average cardinality of actual data flows (step 608). In some embodiments, the average cardinality of actual data flows over the period of time may be determined prior to triggering a congestion control action (step 608).

The method 600 may continue with the congestion controller 144 determining that the average cardinality of the actual data flows has exceeded a predetermined threshold (step 612). Based on the cardinality of actual data flows exceeding the predetermined threshold, the congestion controller 144 may trigger a congestion control action (step 616). In some embodiments, the congestion controller 144 may select and trigger one or multiple different congestion control actions based on a degree to which the average cardinality of actual data flows exceeds the predetermined threshold.

Figure 7:
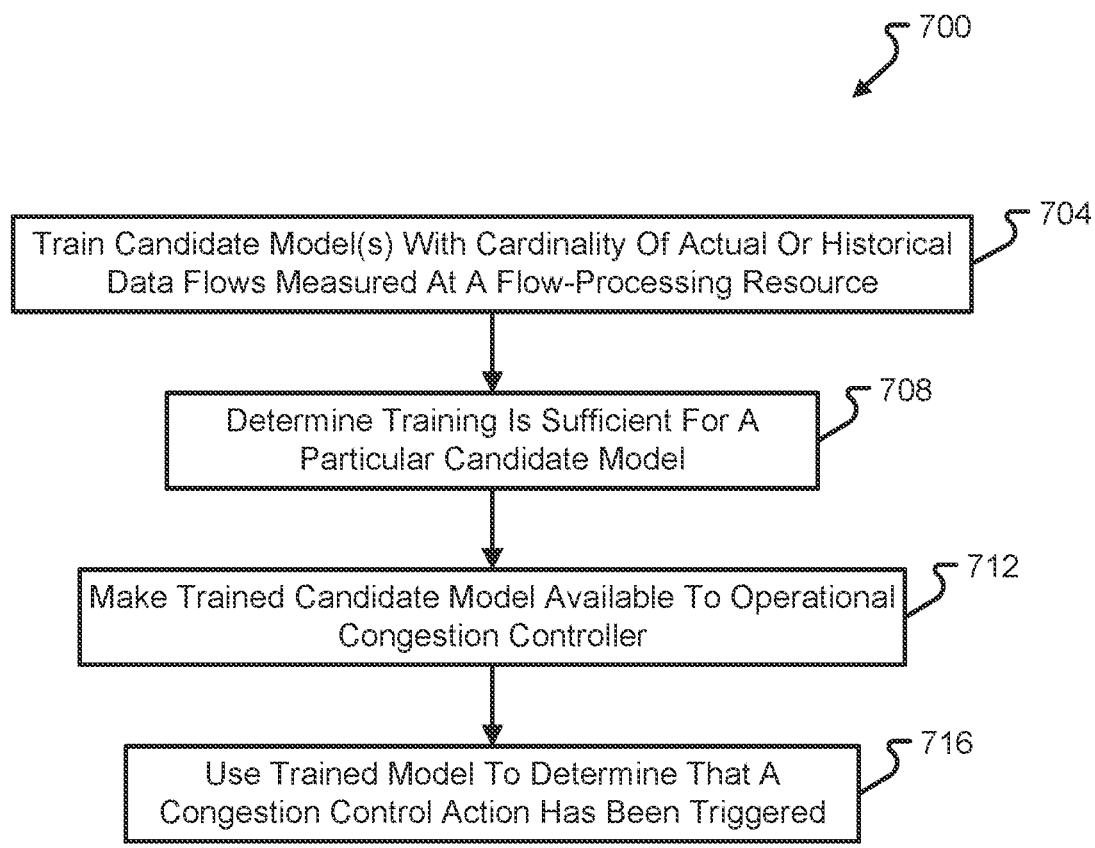
FIG. 7 is a flow diagram illustrating a method of training a data model for use by a congestion controller in accordance with at least some embodiments of the present disclosure.

With reference now to FIG. 7, a method 700 of training candidate model(s) 308 for use by a congestion controller 144 will be described in accordance with at least some embodiments of the present disclosure. The method 700 begins with a model training system 304 training one or more candidate data models 308 (step 704). In some embodiments, the model training system 304 may utilize a training control 312 to train the candidate model(s) 308 with the cardinality of actual or historical data flows for a flow-processing resource 148 (step 704).

The model training system 304 may then utilize the training control 312 to determine that the candidate data model(s) 308 have been sufficiently trained (step 708). A candidate data model 308 may be identified as having been sufficiently trained if the candidate model 308 is trained with training data 316 for at least a predetermined amount of time, has processed a predetermined number of data sets, or has begun exhibiting an acceptable behavior or function as determined by the training control 312.

The method 700 may then continue by making the trained candidate model available to the congestion controller 144 for use as a data model 324 (step 712). The congestion controller 144 may then utilize the newly-trained data model(s) 324 in connection with determining that congestion control action has been triggered (step 716). In some embodiments, the data model(s) 324 may support the congestion controller 144 in measuring or estimating cardinality, in selecting a congestion control action, and/or in automatically implementing the congestion control action.

Figure 8:
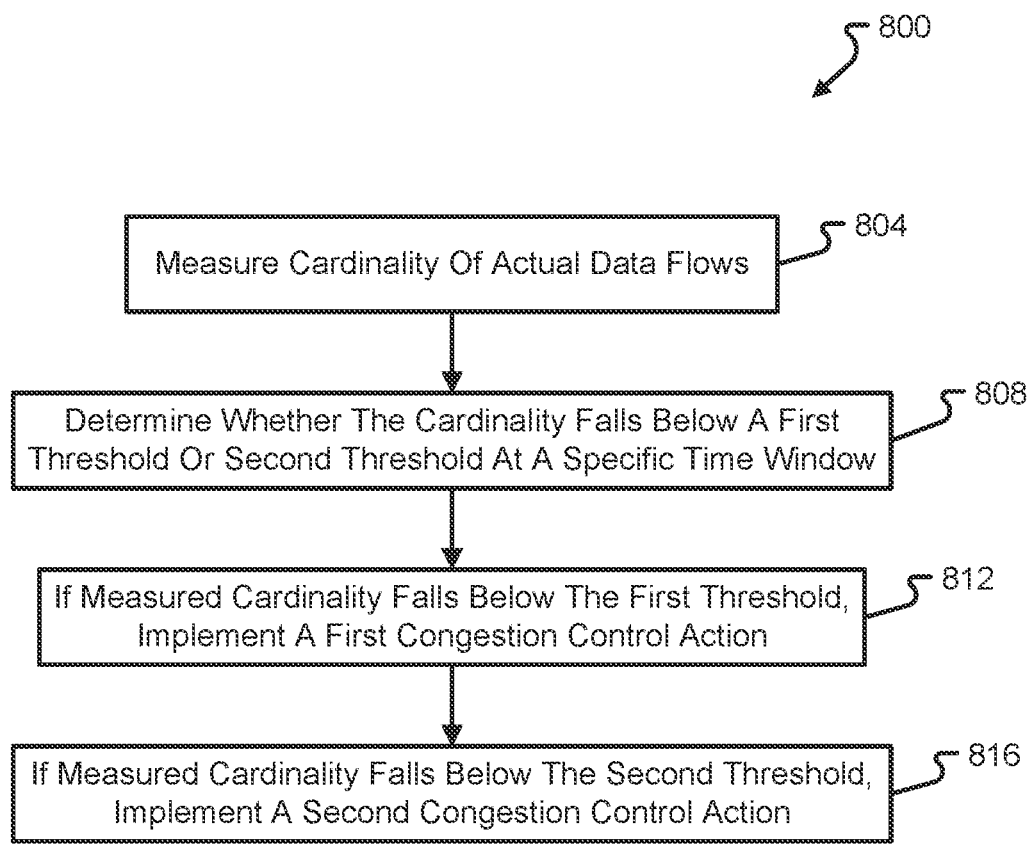
FIG. 8 is a flow diagram illustrating a fourth method of operating a congestion controller in accordance with at least some embodiments of the present disclosure.

Referring now to FIG. 8, another method 800 of operating a congestion controller 144 will be described in accordance with at least some embodiments of the present disclosure. The method 800 begins with the congestion controller 144 measuring or estimating a cardinality of actual data flows at a flow-processing resource (step 804). The congestion controller 144 may then determine whether the measured or estimated cardinality falls below a first threshold and/or second threshold at a specific time window (step 808).

The method 800 may continue with the congestion controller 144 implementing a first congestion control action if the measured cardinality falls below a first threshold (step 812). Alternatively or additionally, the congestion controller 144 may implement a second congestion control action if the measured cardinality falls below a second threshold that is different from the first threshold (step 816). In some embodiments, the first threshold may be less than the second threshold. In some embodiments, the first congestion control action may be more severe than the second congestion control action. For instance, a more severe congestion control action may correspond to flow backoff (or a more significant flow backoff), a window reduction (or a more significant window reduction), etc. than a less sever congestion control action, which may correspond to a fair queuing.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A device, comprising:
a resource configured to receive a number of data flows, wherein the resource is subject to flow congestion when the number of data flows exceeds a threshold value; and
a controller that measures a cardinality of actual data flows received at the resource and implements a congestion control action in response to the cardinality of the actual data flows received at the resource, wherein the controller implements the congestion control action in response to measuring the cardinality of the actual data flows falling below a predetermined value at a specific time window.

2. The device of claim 1, wherein the controller also implements a congestion avoidance action in response to the cardinality of the actual data flows received at the resource.

3. The device of claim 1, wherein the congestion control action comprises at least one of an exponential backoff, a window reduction, and a fair queuing.

4. The device of claim 1, wherein the controller measures the cardinality of the actual data flows over a period of time and determines an average cardinality of the actual data flows prior to implementing the congestion control action.

5. The device of claim 1, wherein the resource comprises a queue.

6. The device of claim 1, wherein the resource comprises processing circuitry of a Graphics Processing Unit (GPU).

7. The device of claim 1, wherein the controller is further configured to measure a second cardinality of the actual data flows, determine a cardinality decay over time, and implement the congestion control action based on the cardinality decay over time.

8. The device of claim 1, wherein the controller is configured to implement a first congestion control action in response to the cardinality of the actual data flows falling below a first threshold, wherein the controller is configured to implement a second congestion control action in response to the cardinality of the actual data flows falling below a second threshold, wherein the first threshold is less than the second threshold, and wherein the first congestion control action is more severe than the second congestion control action.

9. A method, comprising:
measuring a cardinality of actual data flows at a flow-processing resource;
determining that the cardinality of the actual data flows triggers a congestion control action; and
in response to determining that the cardinality of the actual data flows triggers the congestion control action, implementing the congestion control action with respect to the flow-processing resource, wherein the congestion control action is determined to be triggered in response to the cardinality of the actual data flows falling below a predetermined value at a specific time window.

10. The method of claim 9, wherein the flow-processing resource comprises a queue of a switch, and wherein the cardinality of the actual data flows represents a counted number of different data flows received at the queue within a predetermined period of time.

11. The method of claim 9, further comprising:
measuring a second cardinality of the actual data flows;
determining a cardinality decay over time based on the cardinality of the actual data flows and the second cardinality of the actual data flows; and
triggering the congestion control action based on the cardinality decay over time.

12. The method of claim 9, wherein the flow-processing resource comprises processing circuitry of a Graphics Processing Unit (GPU).

13. The method of claim 9, further comprising:
measuring the cardinality of the actual data flows over a period of time; and
determining an average cardinality of the actual data flows prior to triggering the congestion control action.

14. The method of claim 9, further comprising:
training a data model with the cardinality of the actual data flows measured at the flow-processing resource;
updating the data model after training the data model for a predetermined amount of time; and
using the updated data model to determine that the congestion control action has been triggered.

15. A system, comprising:
a processor; and
a computer memory device coupled with the processor, wherein the computer memory device comprises data stored thereon that enables the processor to:
measure a cardinality of actual data flows at a flow-processing resource;
determine that the cardinality of the actual data flows triggers a congestion control action; and
in response to determining that the cardinality of the actual data flows triggers the congestion control action, implement the congestion control action with respect to the flow-processing resource, wherein the congestion control action is determined to be triggered in response to the cardinality of the actual data flows falling below a predetermined value at a specific time window.

16. The system of claim 15, wherein the processor determines that the cardinality of the actual data flows triggers the congestion control action in response to determining that the cardinality of the actual data flows at the flow-processing resource is below a predetermined threshold.

17. The system of claim 15, wherein the processor implements a first congestion control action in response to the cardinality of the actual data flows falling below a first threshold, wherein the processor implements a second congestion control action in response to the cardinality of the actual data flows falling below a second threshold but not below the first threshold, wherein the first threshold is less than the second threshold, and wherein the first congestion control action is more severe than the second congestion control action.

18. The system of claim 15, wherein the flow-processing resource comprises processing circuitry of a Graphics Processing Unit (GPU).

19. The system of claim 15, wherein the data comprises a data model that has been trained on historical cardinality measurements of data flows.

20. The system of claim 15, wherein the flow-processing resource comprises a queue.

* * * * *